US008957900B2

(12) United States Patent
Lau et al.

(10) Patent No.: US 8,957,900 B2
(45) Date of Patent: Feb. 17, 2015

(54) COORDINATION OF ANIMATIONS ACROSS MULTIPLE APPLICATIONS OR PROCESSES

(75) Inventors: Bonny Lau, Bellevue, WA (US); Song Zou, Bellevue, WA (US); Wei Zhang, Redmond, WA (US); Brian Beck, Redmond, WA (US); Jonathan Gleasman, Seattle, WA (US); Pai-Hung Chen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 12/966,787

(22) Filed: Dec. 13, 2010

(65) Prior Publication Data

US 2012/0147012 A1    Jun. 14, 2012

(51) Int. Cl.
*G06T 13/00* (2011.01)
*G06F 3/048* (2013.01)

(52) U.S. Cl.
CPC ..................................... *G06T 13/00* (2013.01)
USPC ........... 345/473; 345/474; 345/475; 715/764; 715/765; 715/769; 715/781

(58) Field of Classification Search
CPC ..................... G06T 13/00–13/80; G06F 3/048
See application file for complete search history.

(56) References Cited

U.S. PATENT DOCUMENTS

| | | | |
|---|---|---|---|
| 2008/0034292 A1* | 2/2008 | Brunner et al. | 715/700 |
| 2008/0165207 A1 | 7/2008 | Koshak et al. | |
| 2009/0112906 A1 | 4/2009 | Shuster | |
| 2009/0144402 A1* | 6/2009 | Harrison | 709/221 |
| 2009/0313295 A1* | 12/2009 | Blaxland et al. | 707/103 R |
| 2009/0315897 A1* | 12/2009 | Kwiatkowski et al. | 345/473 |

FOREIGN PATENT DOCUMENTS

| | | |
|---|---|---|
| CN | 101048735 A | 10/2007 |
| CN | 100428182 C | 10/2008 |
| CN | 100481013 C | 4/2009 |
| WO | 2005103900 A1 | 11/2005 |
| WO | 2006017388 A1 | 2/2006 |

OTHER PUBLICATIONS

A Distributed 3D Graphics Library ; Published Date: Jul. 24, 1998 http://reference.kfupm.edu.sa/content/d/i/a_distributed_3d_graphics_library_99069.pdf.
Create Moving Experiences Animated Transitions—Retrieved Date: Sep. 16, 2010 http://today.java.net/article/2007/10/17/create-moving-experiences-animated-transitions.

(Continued)

*Primary Examiner* — Tize Ma
(74) *Attorney, Agent, or Firm* — Bryan Webster; Peter Taylor; Micky Minhas

(57) ABSTRACT

Animation coordination system and methods are provided that manage animation context transitions between and/or among multiple applications. A global coordinator can obtain initial information, such as initial graphical representations and object types, initial positions, etc., from initiator applications and final information, such as final graphical representations and object types, final positions, etc. from destination applications. The global coordination creates an animation context transition between initiator applications and destination applications based upon the initial information and the final information.

20 Claims, 14 Drawing Sheets

(56) References Cited

OTHER PUBLICATIONS

Waiting for Objects, Windows and Processes in TestComplete—Retrieved Date: Sep. 16, 2010 http://www.automatedqa.com/products/testcomplete/screencasts/waiting-for-objects/.

Advanced Synchronization Patterns for Process-Driven and Service-Oriented Architectures—Retrieved Date: Sep. 16, 2010 http://www.infosys.tuwien.ac.at/Staff/zdun/publications/soaSyncPatterns.pdf.

ESRI 3D Analyst: Animation Customization—Retrieved Date: Sep. 16, 2010 http://edndoc.esri.com/arcobjects/8.3/Technical Documents/3D%20Analyst/Animation/DDDAnalyst Animation CustomizationTechPaper.htm.

Animation—Retrieved Date: Sep. 16, 2010 http://www.openlaszlo.org/lps4.8/docs/developers/animation.html.

"International Search Report", Mailed Date: May 29, 2012, Application No. PCT/US2011/063458, Filed Date: Dec. 6, 2011, pp. 9.

Kim, Ji Yong., "A Study of classification and application for Transition effect in Graphic User Interface", Master Thesis, Kookmin University, Korea, Feb. 28, 2011, pp. 62.

"Office Action and Search Report Issued in Chinese Patent Application No. 201110414237.0", Mailed Date: Aug. 12, 2014, 12 pages.

* cited by examiner

COORDINATION OF ANIMATIONS ACROSS MULTIPLE APPLICATIONS OR PROCESSES

TECHNICAL FIELD

The subject disclosure relates to coordination of animations across multiple applications or processes of a computing system, e.g., from one context of the computing system to another.

BACKGROUND

As available computing resources continue to increase in line with advances in computing technology, additional resources become expendable on providing rich user experiences. One mechanism to provide rich experiences is animation. Animations can be employed to create fluid and seamless transitions between different contexts. For instance, context transitions, e.g., a transition from one mode of an application to another mode of the application, can be animated to provide a user with a seamless, visual switch between the modes.

However, in some situations, context transitions can involve or extend across multiple processes or applications. In an example of such a transition, opening a picture, in a picture viewing application, from a thumbnail representation in a file exploration application, involves a context switch from the file exploration application to the picture viewing application. Further to this example, the picture viewing application can display the picture in a full screen representation.

Typically, animating such a context switch, e.g., between the file exploration application and the picture viewing application, can be attempted in a unilateral or bilateral fashion. In a unilateral manner, either the file exploration application or the picture viewing application can drive a visual transition animation. However, the file exploration application, if it draws the animation, does not know where the destination point, e.g., of the display, is in the picture viewing application. Similarly, when the picture viewing application draws the animation, the picture viewing application does not possess knowledge on an origination point, in the file exploration application, of the animation.

For bilaterally driven animations, applications involved in a transition will jointly draw an animation. According to the previous example, the file exploration application and the picture viewing application can both draw the animation. For instance, the file exploration can initiate the animation, e.g., start rendering, e.g., drawing, the animation, and the picture viewing application can finish the animation. Accordingly, a handoff, of drawing responsibility, occurs between the file exploration application and the picture viewing application. The handoff causes a seam or incongruency in the animation, which is visible to the user.

The above-described deficiencies of today's visual transition systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, a generic framework can be employed to create seamless animations of context transitions between arbitrary applications. The framework includes an animation coordinator that interacts with applications to obtain initial information from initiator applications, e.g., applications at starting points of animations, and final information from destination applications, e.g., applications at ending points of animations. The animation coordinator generates animations based upon the initial information and the final animation and drives the animations from outside of initiator applications and/or destination applications to enable seamless and smooth animated transitions between different contexts.

In some embodiments, the animation coordinator synchronizes initiator applications and destination applications such that the destination applications can immediately capture focus and/or control upon completion of the animation. For instance, in an application launch transition, the animation coordinator can pause for an indication from a destination application that it is in a ready state. Upon receiving the indication, the animation coordinator can drive the animation.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
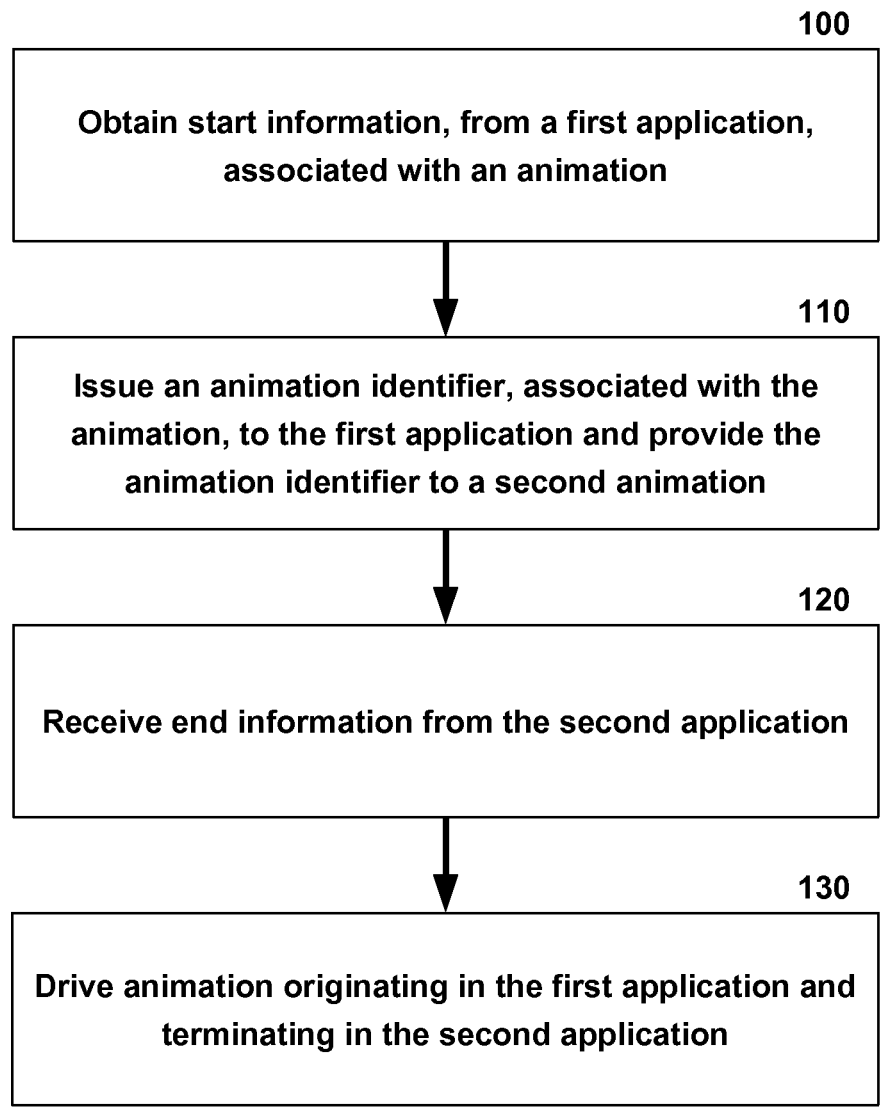
FIG. 1 is a flow diagram illustrating an exemplary, non-limiting embodiment for coordinating an animation spanning across multiple applications.

As discussed in the background, visually animated context transitions between different applications cannot be generally employable by virtually any application on a computing system, e.g., a computing device, while remaining seamless to a user. For instance, two unrelated applications, e.g., applications developed and/or controlled by different developers, cannot exchange information to enable a seamless animated transition therebetween. While two applications, developed and/or controlled by a single developer, can be hard-coded with mechanisms to animate a context transition, such mechanisms are only available to and employable by those two applications for animation of transitions merely between the two applications.

Further, two arbitrary applications or processes, e.g., unrelated applications, could leverage other conventional mechanisms to implement a transitional animation. For instance, such applications can employ inter-process communication techniques, shared memory spaces, inter-process synchronization techniques, etc., to execute a handoff of a transitional animation commenced by one application and concluded by another application. Conventional mechanisms, however, cannot create a seamless and smooth animation as the handover point, e.g., the point where responsibility for drawing the animation changes, results in an animation artifact visible to a user. Accordingly, conventional techniques to create visual animations of context transitions cannot generate seamless animations between multiple arbitrary applications and processes in a generalized and generic manner.

In various, non-limiting embodiments, a generic framework can be employed to create seamless animations of context transitions between arbitrary applications. The generic framework provides a uniform application program interface (API) employable by applications to serve up information to create transitional animations. The generic framework retains information from initiator applications, e.g., applications from which animations originate, and destination applications, e.g., applications where animations terminate, and correlates such information to enable an animation to be drawn from a particular initiator application to a particular destination application.

According to further embodiments, the framework includes a global coordinator that interacts with the applications to obtain initial information and terminal information. In addition, the global coordinator controls animation timing and drawing, based upon the initial and terminal information, to create a seamless transition. Further, the global coordinator can communicate with coordinators, compositors, or other components of other virtual or physical machines to animate context switches between applications and/or processes on disparate virtual or physical machines.

In one embodiment, a method is described herein that includes receiving initial information from an initiator application, wherein the initial information relates to a transitional animation that visualizes a shift in user context from the initiator application to a destination application, receiving final information, associated with the transitional animation, from the destination application, generating the transitional animation based at least in part on the initial information and the final information, and drawing the transitional animation on a display device of the computing system. The method can also include generating an animation identifier that corresponds to the transitional animation, issuing the animation identifier to at least one of the initiator application or the destination application, and retaining the initial information and the final information in association with the animation identifier. Further, in an example, receiving the final information can include receiving the final information from the destination application along with the animation identifier to enable association of the final information with the initial information. In another example, generating the transitional animation can include creating a plurality of intermediate graphical representations that bridge a difference between an initial graphical representation included in the initial information and a final graphical representation specified in the final information, wherein a number of intermediate graphical representations created is in accordance with a predetermined frame rate of the transitional animation, and can further include determining a set of position information respectively associated with the plurality of intermediate graphical representations, wherein position information is determined based upon at least one of initial position information in the initial information, final position information included in the final information, or other position information included in the set of position information.

According to further examples, drawing the transitional animation can include ordering the initial graphical representation, the plurality of intermediate graphical representations, and the final graphical representation to create a frame order, and sequentially and individually drawing the initial graphical representation, the plurality of intermediate graphical representations, and the final graphical representation in accordance with the frame order, wherein a time between drawings is determined based upon the predetermined frame rate. Moreover, drawing can involve enforcing a z-position of the transitional animation such that the transitional animation remains a top-most object on the display device. In yet another example, the method can include waiting for a readiness indicator from the destination application before commencing drawing of the transitional animation, wherein receiving the end information from the destination application is the readiness indicator.

In another embodiment, a system, as described herein, includes an animation coordination component which includes an input component configured to obtain initial information from one or more initiator applications and to obtain final information from one or more destination applications and an animation component configured to create and to draw animations on a display device, e.g., display screen, wherein the animations provide seamless transitions from environments associated with the one or more initiator applications to environments associated with the one or more destination applications. The animation coordination component can further include an identifier generation component configured to issue animation identifiers to individual animations coordinated by the animation coordination component, wherein the animation identifiers comprise global identifiers (GIDs), such as, but not limited to, globally unique identifiers (GUIDs). An output component is provided that is configured to transmit animation identifiers to the one or more initiator applications as a receipt of the initial information. In further examples, the animation coordination component can include a frame generation component configured to create animation frames for the animations to be drawn by the animation component.

The initial information, in an example, includes at least one of initial graphical representations of objects in the one or more initiator applications, types of the objects in the one or more initiator applications, respective positions of the initial graphical representations, or respective sizes of the initial graphical representations. Similarly, the final information includes at least one of final graphical representations of objects in the one or more destination applications, types of the objects in the one or more destination applications, respective positions of the final graphical representations, or respective sizes of the final graphical representations.

In an additional embodiment, an animation coordination subsystem can be integrated into an operating system and include a first application program interface (API) configured to enable triggering of an animation that seamlessly visualizes a transition between disparate contexts, wherein the first API is adapted to receive initial information, from an initiator application, that represents a starting point for the animation and to return an animation identifier corresponding to the animation and a second API configured to receive final information that represents a ending point for the animation, wherein the final information is received in connection with the animation identifier and from a destination application. The animation coordination module generates the animation based upon the initial information and the final information and outputs the animation to a display screen.

Herein, an overview of some of the embodiments for providing seamless transitional animations across multiples applications has been presented above. As a roadmap for what follows next, various exemplary, non-limiting embodiments and features for global animation coordination are described in more detail. Then, some non-limiting implementations and examples are given for additional illustration, followed by representative network and computing environments in which such embodiments and/or features can be implemented.

Transitional Animations Between Multiple Applications/Processes

As mentioned above, in various embodiments, a framework is provided which is configured to generate animations that extend between multiple applications. In one example, the animations include a visual morph of a graphical representation of an object in a first application to another graphical representation of an object in a second application. The initial graphical representation and the terminal graphical representation, in one aspect, can be different representations of a common base object. For instance, the initial graphical representation and terminal graphical representation can vary in one or more characteristics, e.g., resolution, size, fidelity, granularity, location, etc., and the animation can comprise a seamless transformation from the initial graphical representation to the terminal graphical representation. In another aspect, the initial graphical representation and the terminal graphical representation can represent disparate objects such as but not limited to, text objects, picture objects, image objects, video objects, map objects, list objects, web objects, or the like. In the case of disparate objects, the animation can comprise a morphological transformation from one representation of one object to another representation of another object. For instance, the animation can visually depict a transformation of a portion of text into an image. In further embodiments, animations can be generated that transform a plurality of objects into a single object and/or that transform a single object into a plurality of objects.

Moreover, the multiple applications can reside on a single virtual or physical machine or reside on different virtual and/or physical machines. Further, the multiple applications can be multiple instances or processes of a single application. In yet another embodiment, a single application can leverage the framework provided herein for intra-application transitions. For instance, a browser application can utilize animated transitions when browsing between different domains, e.g., browsing from a first web page to a second web page. Accordingly, the framework, in addition to creating inter-application animations, can be leveraged for intra-application transitions, in a generalized manner.

With respect to one or more non-limiting ways to coordinate animations of context transitions as described above, FIG. 1 shows a flow diagram illustrating an exemplary, non-limiting embodiment for coordinating an animation spanning across multiple applications. At 100, start information associated with an animation is obtained from a first application. In a specific, non-limiting example, the start information is obtained by a global coordinator, as described herein, which can reside on a physical or virtual machine along with the first application. However, it will be appreciated that that the global coordinator can reside on a different physical or virtual machine from the first application.

The start information can specify parameters to commence an animation. For instance, the start information can include an initial graphical representation of an object, in the first application, which is a starting frame of the animation. The start information can also include a position, e.g., x-coordinates, y-coordinates, etc., on a display at which the initial graphical representation is drawn. The position on the display can relate to a position on a real, physical display or a position on a virtual display. Further, a size of the initial graphical representation can be included in the start information. In an example, the position and size information can be conveyed as a bounding rectangle of the initial graphical representation. The bounding rectangle can be specified by a height, a width, and coordinates of a predetermined corner, e.g., upper-left, upper-right, lower-left, or lower-right.

At 110, an animation identifier, associated with the animation, can be issued. In one aspect, the animation identifier can be a global identifier; however, other types of identifiers can be employed as the animation identifier. According to one embodiment, the global coordinator can generate the animation identifier and issue the animation identifier to the first application. In another embodiment, the first application can generate the animation identifier. In addition, the global coordinator and/or the first application, depending on which generates the identifier, can provide the animation identifier to a second application where the animation concludes.

At 120, end information is received from the second application. End information, similar to the start information, can include a final graphical representation, of the second application, which is a final frame of the animation. In addition, the end information can include a position of the final graphical representation, a size of the final graphical representation, and/or a bounding rectangle of the final graphical representation. At 130, the animation, originating in the first application and terminating in the second application, is driven based upon the start information and the end information. For instance, the global coordinator can draw the animation beginning with the initial graphical representation at the position indicated in the start information and ending with the final graphical representation at the position indicated in the end information. The global coordinator can influence a z-order of graphical objects, e.g., windows, etc., on the display to ensure that the animation remains the top-most object relative to at least the first application and the second application.

In a further embodiment, the animation can be driven in accordance with timing or synchronization enforced by the global coordinator. For instance, the global coordinator starts rendering the animation after receiving notification that the second application is ready. The notification can be explicit, e.g., the second application sends a specific message to the global coordinator, or the notification can be implicit, e.g., the global coordinator presumes readiness upon receiving the end information. Prior to sending notification of readiness, the second application can render an associated window and user interface, but keep the user interface hidden. Once the animation completes, the rendered window and user interface can be made visible to create a seamless context transition. By waiting for a readiness signal from the second application, the seamless animation can occur since the user interface of the second application can be displayed quickly.

Figure 2:
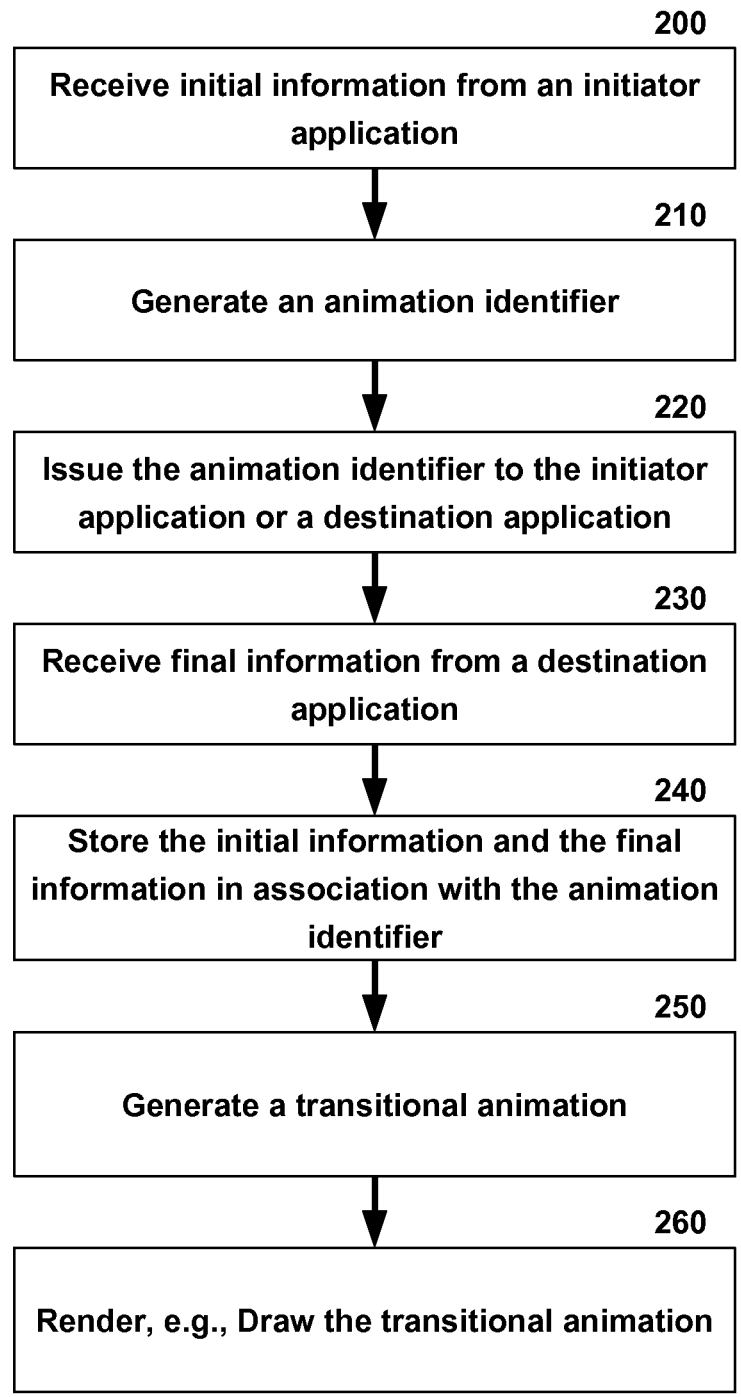
FIG. 2 is a flow diagram illustrating another exemplary and non-limiting embodiment for coordinating an animation across multiple applications.

FIG. 2 shows a flow diagram illustrating another exemplary and non-limiting embodiment for coordinating an animation spanning across multiple applications. At 200, initial information from an initiator application is received. The initial information relates to and triggers a transitional animation that visualizes a shift in user context from the initiator application to a destination application. At 210, an animation identifier, corresponding to the transitional animation, is generated. At 220, the animation identifier is issued to the initiator application and/or the destination application. The animation identifier provides a receipt of the initial information as well as indicates that the transitional animation is being constructed. Moreover, the animation identifier provides a reference which can be employed to associate various data and/or messages to the transitional animation.

At 230, final information, associated with the transitional animation, is received from the destination application. In one example, the final information can be received in connection with the animation identifier. At 240, the initial information and the final information can optionally be stored in association with the animation identifier. In a further embodiment, prior to commencing display of the transitional animation, the process can wait until a readiness indicator is received from the destination application. In a specific, non-limiting example, receiving the final information can operate as an implicit readiness indication.

Figure 3:
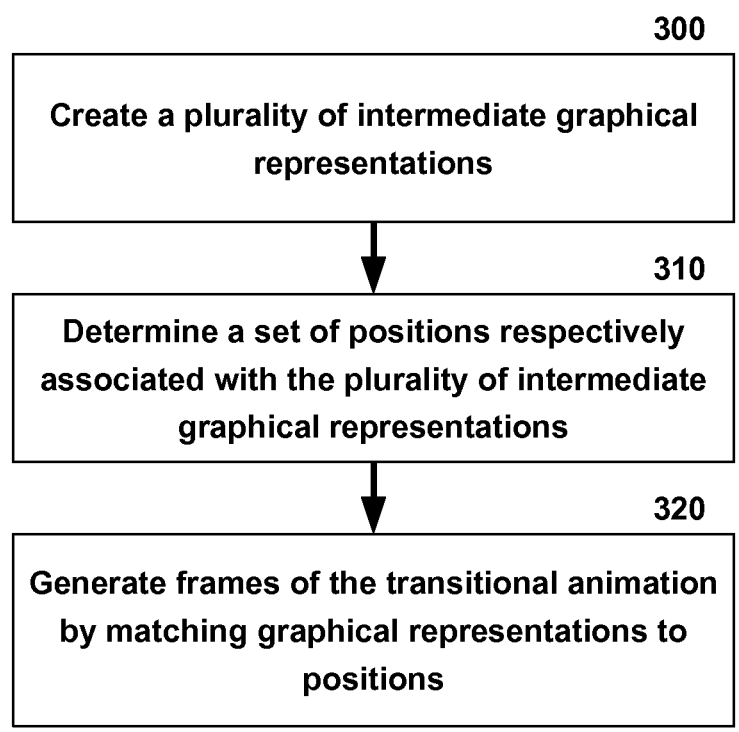
FIG. 3 is a flow diagram illustrating an exemplary, non-limiting embodiment for generating an animation.

At 250, the transitional animation is generated. Turning briefly to FIG. 3, illustrated is a flow diagram of an exemplary, non-limiting embodiment for generating an animation. At 300, a plurality of intermediate graphical representations can be created. The intermediate graphical representations can bridge a gap between an initial graphical representation and a final graphical representation. In an embodiment, the number of intermediate graphical representations created can be based upon a predetermined frame rate of the transitional animation. At 310, a set of positions are determined, wherein the set of positions are respectively associated with the plurality of intermediate graphical representations. According to an example, the positions can be determined based upon an initial position of the initial graphical representation, a final position of the final graphical representation, and/or other positions in the set of positions. At 320, animation frames are generated by matching graphical representations to positions.

Figure 4:
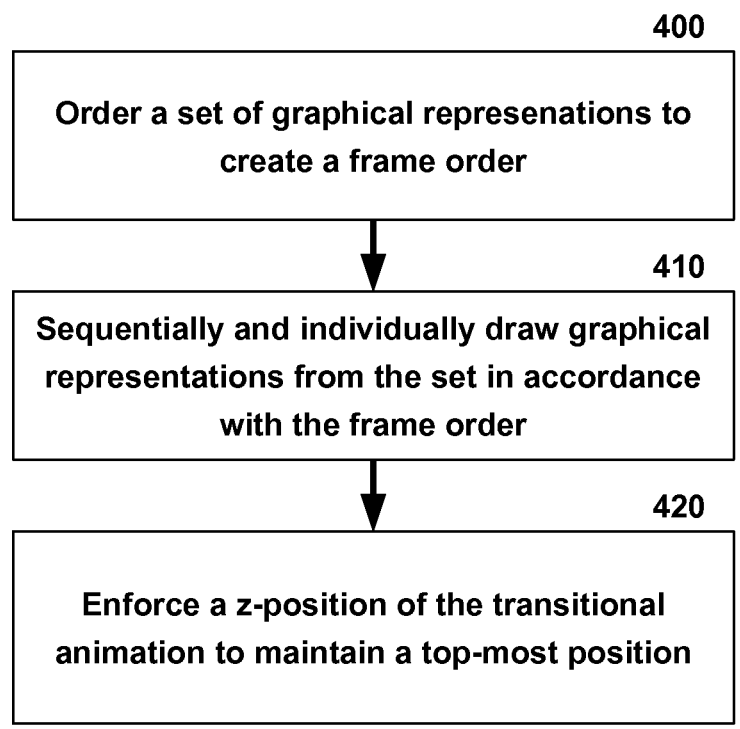
FIG. 4 is a flow diagram illustrating an exemplary, non-limiting embodiment for drawing an animation.

Turning back to FIG. 2, the transitional animation is drawn at 260, which is further illustrated in an exemplary, non-limiting embodiment depicted in FIG. 4. As shown in FIG. 4, at 400, a set of graphical representations are ordered to create a frame order. At 410, graphical representations from the set of graphical representations are sequentially and individually drawn in accordance with the frame order. Additionally, at 420, during drawing, a z-position of the animation is enforced to maintain the animation at a top-most position.

Figure 5:
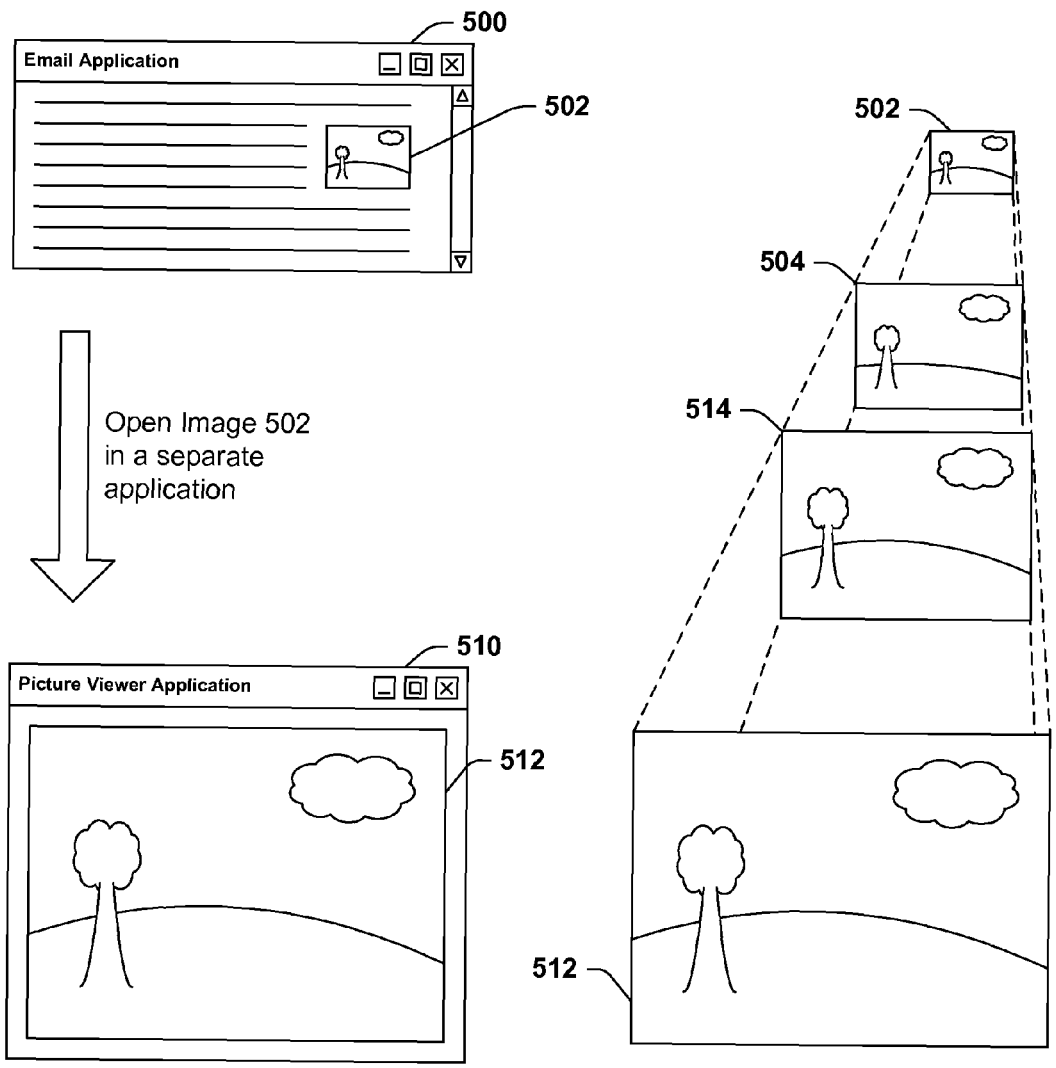
FIG. 5 is an exemplary, non-limiting illustration of a transition animation that bridges multiple applications.

FIG. 5 is an exemplary, non-limiting illustration of a transition animation that bridges multiple applications. As shown in FIG. 5, an animation can visually perform a context transition from a first application, e.g., email application 500, to a second application, e.g., picture viewer application 510. Email application 500 can be any suitable email application capable of receiving, viewing, drafting, sending, etc., emails. As illustrated in FIG. 5, email application 500 can view emails which contain embedded images, such as image 502. In one embodiment, email application 500 displays image 502 as a thumbnail representation embedded within a displayed email message.

A user can elect to view a larger representation, if available, in picture viewer application 510. To do so, the user can double-click image 502, right-click image 502 and select a command to open image 502 in picture viewer application 510, or employ some other means available in the user interface of email application 500. In a non-limiting example, email application 500 can utilize facilities of a host operating system to look up file associations maintained by the operating system to identify which application is associated with a file type of image 502. Once email application 500 identifies picture viewer application 510 as the application associated with the file type of image 502, email application 500 can employ additional mechanisms of the operating system to launch picture viewer application 510 with a file corresponding to image 502. Picture viewer application 510 can execute, open the file corresponding to image 502, and display a larger representation in the form of image 512. In another example, email application 500 can signal to the operating system a file type and/or file name desired to be opened/viewed in a separate application. The operating system can identify the appropriate program, e.g., picture viewer application 510, execute the program, and provide the program with the file.

An application launch scenario, as described in the above example, involves a sudden context transition from the environment of email application 500 to the environment of picture viewer application 510. Typically, such a context transition is abrupt. For instance, the user double-clicks image 502 in email application 500 and instructs the operating system to launch picture viewer application 510 with the file associated with image 502. Once picture viewer application 510 commences execution, various background tasks are performed. Picture viewer application 510 can access the file and access stored information of the file. Further, picture viewer application 510 can display a splash screen during background processing. Ultimately, picture viewer application 510 renders a window and/or a user interface which is displayed on a screen or other output display. Conventionally, the transition from double-clicking image 502 to displaying the window or user interface of picture viewer application 510 can be sharp. For instance, from a visual perspective, e.g., what the user sees on the output display, the user views email application 500, followed by picture viewer application 510 becoming visible in an instant after some time period passes. Optionally, display of picture viewer application 510 can be preceded by an abrupt display of a splash screen. In another example, depending on system resources and/or a manner in which the application is coded, the display of picture viewer application 510 can be discontinuous with various portions of the user interface becoming visible in a stepped fashion.

As described above, an animation can be generated to provide a seamless and smooth transition from email application 500 to picture viewer application 510. The animation, as shown in FIG. 5, can be a visual enlargement or conversion of image 502, e.g., an initial graphical representation, to image 512, e.g., a final graphical representation. The animation can include a plurality of frames ordered from a start frame (image 502) to an end frame (image 512). Intermediate frames, such as frame 504 and frame 514 can be generated. Intermediate frames can be generated from a preceding frame and/or the start frame. In another example, intermediate frames can be generated in a reverse order, e.g., based upon a subsequent frame and/or the end frame. It will be appreciated that both generation techniques can be employed to provide high quality intermediate frames closely related to neighboring frames. For instance, an intermediate frame close to the end frame can have higher quality if generated from the end frame as opposed to the start frame. A number of intermediate frames can depend on various factors such as, but not limited to, duration of the animation and a desired frame rate. According to a non-limiting example, consider a two second animation with a frame rate of 24 frames per second. The animation would include 48 total frames. The frames can be ordered and displayed such that image 502, occupying a start position, morphs into a larger representation, e.g., image 512 while translating to a final position occupied by image 512.

Figure 6:
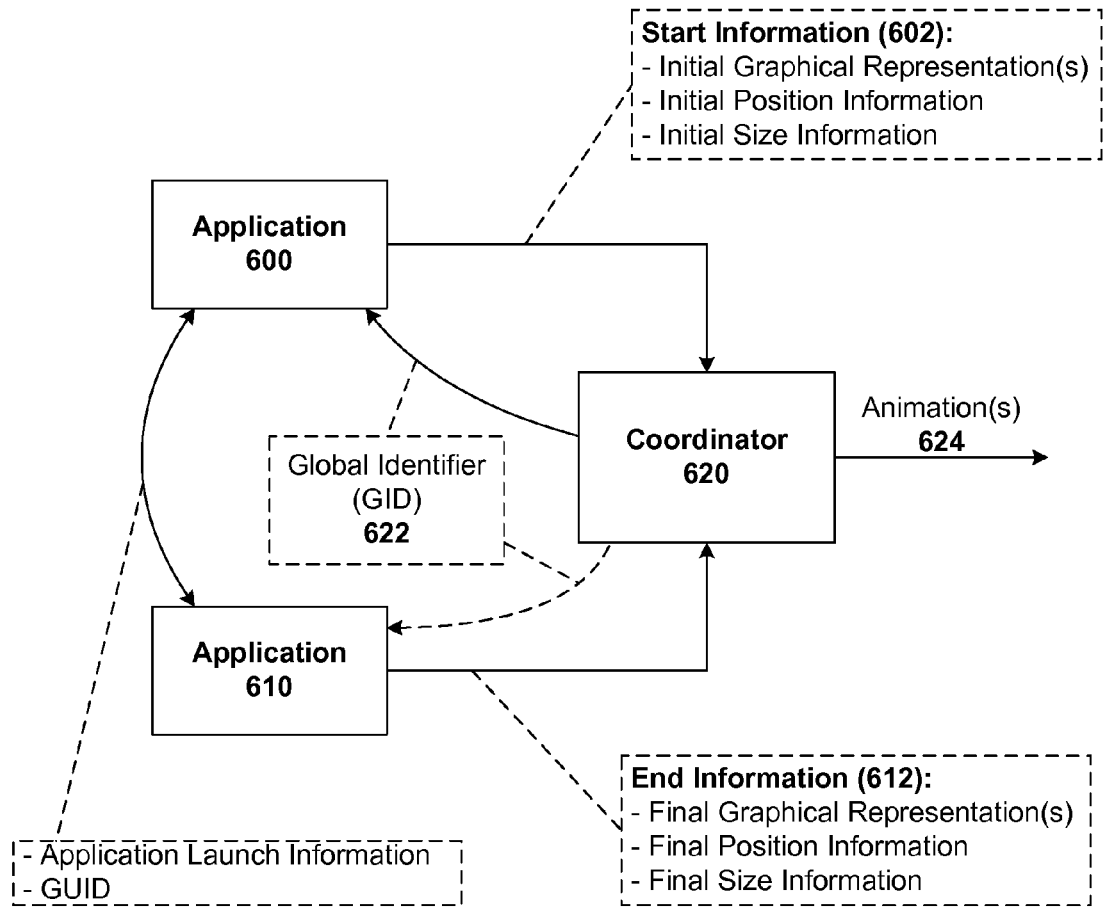
FIG. 6 is a block diagram illustrating an exemplary, non-limiting animation coordination system.

FIG. 6 is a block diagram illustrating an exemplary, non-limiting animation coordination system. The animation coordination system includes an application 600, e.g., a first application, and an application 610, e.g., a second application, between which an animated context transition occurs. The system can also include a coordinator 620 configured to generate an animation 624, synchronize application 600 and application 610, and draw animation 624. In a specific, non-limiting embodiment, coordinator 620 can be a global component of an operating system (not shown) hosting application 600 and application 610. However, it will be appreciated that coordinator 620 can be a separate process from the operating system.

Application 600 can initiate animation 624 by sending start information 602 to coordinator 620. Start information 602, in an embodiment, can specify one or more initial graphical representations, initial position information, and/or initial size information. As described above, coordinator 620 can generate animations that transition many objects into a single object, a single object into many objects, and/or a single object into another single object. Accordingly, start information 602 can include a plurality of initial graphical representations with respective position and size information in the case of a many-to-one transition. In the case of a one-to-many or a one-to-one transition, start information 602 can include a single initial graphical representation with respective position and size information.

Coordinator 620, upon receipt of start information 602, generates a global identifier (GID) 622 as an animation identifier. GID 622 is associated with animation 624 and employed to index start information 602 as related to animation 624. Coordinator 620 provides GID 622 to application 600 in response to start information 602. In addition, coordinator 620 can also provide GID 622 to application 610. Alternatively, application 600 can include GID 622 in application launch information passed to application 610 via operating system launch mechanisms employed to start application 610 from application 600. In either regard, GID 622, when received by application 610, operates to notify application 610 that animation 624 will occur to visually transition from a context of application 600 to a context of application 610.

Upon obtaining GID 622, application 610 can transmit end information 612 to coordinator 620. End information 612, similar to start information 602, can include one or more final graphical representations, final position information, and/or final size information. Application 610 can transmit end information 612 in connection with GID 622 to enable coordinator 620 to associate end information 612 with start information 602 and animation 624 already associated with GID 622.

Application 610 can transmit end information 612 as an implicit indication of readiness. For instance, by sending end information 612, application 610 notifies coordinator 620 that application 610 is prepared to catch animation 624 when drawn. Accordingly, application 610 can perform any start-up processing to prepare to display a user interface or window, prior to transmitting end information 612, to prevent animation 624 completing before application 610 can draw its window or user interface.

Upon receiving end information 612, coordinator 620 can generate animation 624 based, at least in part, on start information 602 and end information 612. For instance, coordinator 620 can utilize initial graphical representations in start information 602 as start frames and final graphical representations in end information 612 as end frames. Coordinator 620 generates a plurality of intermediate frames from the initial graphical representations and/or the final graphical representations as described in connection with FIG. 5. Coordinator 620 can order and draw frames of animation 624 to provide a seamless and smooth transition from the context of application 600 to the context of application 610.

As described above, the graphical representations, which are end points of animations, can depict a variety of objects, such as, but not limited to, lists of information, pictures, photos, clip art, logos, text, videos, web pages, graphics, maps, combinations of the foregoing, etc. For illustrative purposes, the following non-exhaustive and non-limiting examples reveal some types of animations that can be employed for context transitions between applications, within applications, between virtual machines, between physical machines, etc. In one example, a barcode can be an initial graphical representation for animation that terminates at some representation of a product specified by the barcode. For instance, the barcode can transition to a web page about the product, an image of the product, a specification sheet on the product, or the like. Similarly, an advertisement or image associated with a company, e.g., on a web page, in an electronic magazine, etc., can transition into a product list of offerings from the company, a web page to purchase a product, or the like. In another example, a contact name, e.g., in an address book application, on an electronic business card, etc., can be animated into another representation of the person, such as a photograph, a public social media profile, a map depicting a location, etc. In yet another example, a diagram or illustration of an object can be animated from a collapsed version to an exploded version. For instance, an engineering design application can employ embodiments described herein to animate an explosion of a design of a device.

Figure 7:
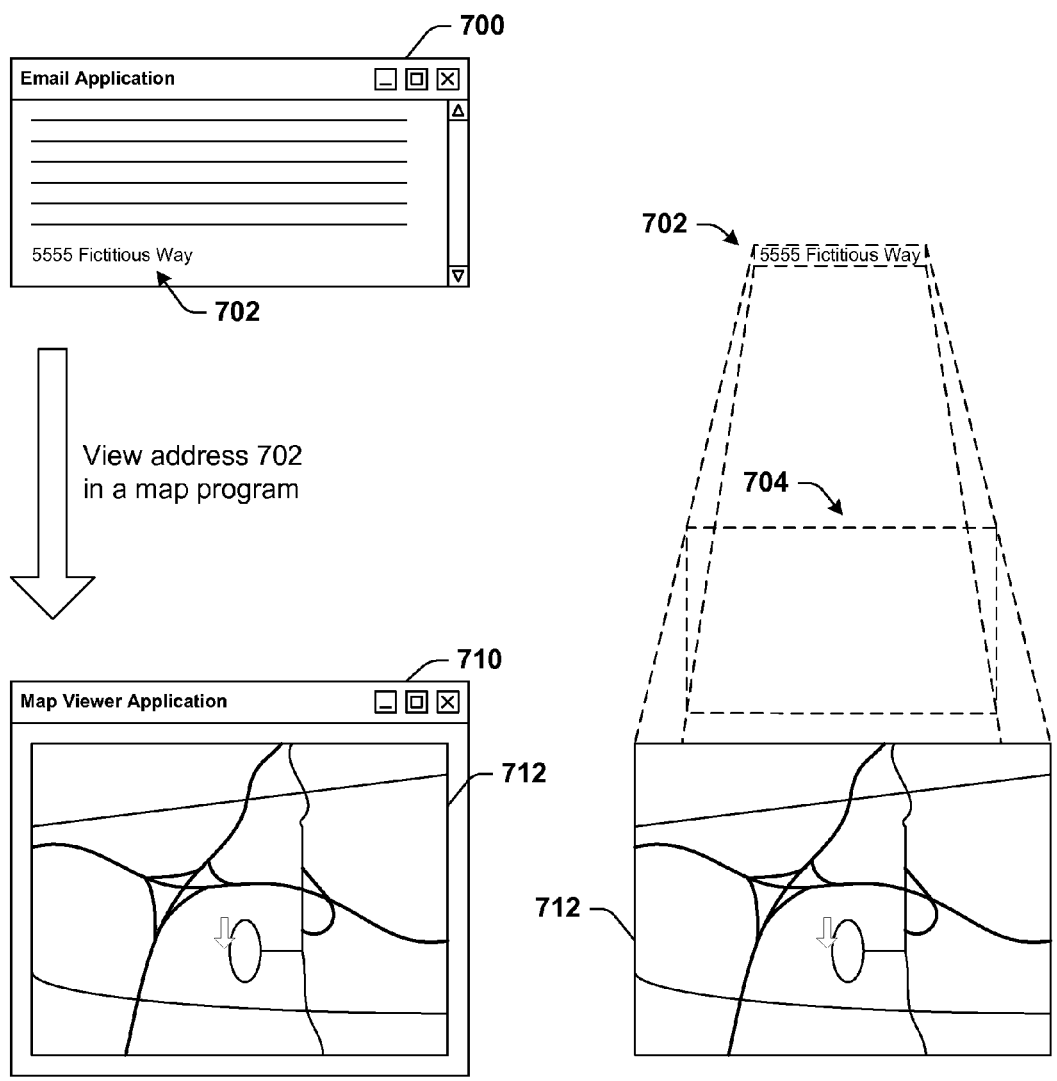
FIG. 7 is an exemplary, non-limiting illustration of a transition animation that bridges multiple applications and includes disparate initial and final graphical representations.

In a further example, FIG. 7 is an exemplary, non-limiting illustration of a transition animation that bridges multiple applications and includes initial and final graphical representations associated with disparate objects. As shown in FIG. 7, an animation can visually perform a context transition from a first application, e.g., email application 700, to a second application, e.g., map viewer application 710. In particular, the animation can involve a contextual transition from an address 702 in an email message to a corresponding location on a map 712. Launching of map viewer application 710 from email application 700 can occur in a manner similar to that described above with reference to FIG. 5. In addition, coordination of the animation between email application 700 and map view application 710 can be implemented with the methods and systems previously described.

The initial graphical representation for the exemplary animation illustrated in FIG. 7 is address 702, which is made up of a portion of text bounded by an invisible rectangle. The final graphical representation is map 712, which comprises a graphical image of roads, intersections, buildings, satellite imagery, etc. A coordination component, such as coordinator 620, configured to generate and control animations bridging multiple applications, can generate one or more intermediate frames 704. The intermediate frames 704 can be based upon various composites of the initial graphical representation and the final graphical representations to provide an animated metamorphosis from the text included in address 702 to the graphics included in map 712.

Figure 8:
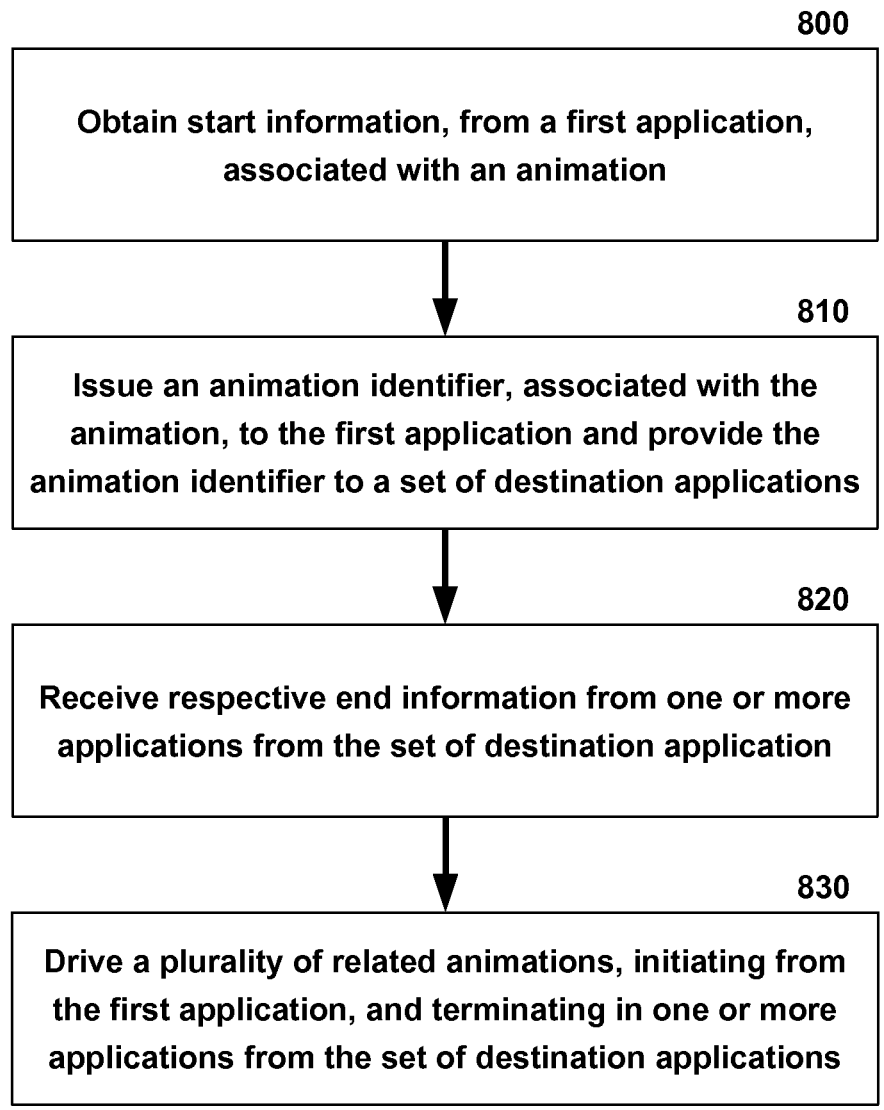
FIG. 8 is a flow diagram illustrating an exemplary, non-limiting embodiment for coordinating one or more animations initiated by one application and terminating in a plurality of applications.

In a further embodiment, FIG. 8 illustrates a flow diagram of an exemplary, non-limiting method for coordinating one or more animations initiated by one application and terminating in a plurality of applications. At 800, start information associated with one or more animations is obtained from a first application. At 810, an animation identifier is generated and issued to the first application, wherein the animation identifier is associated with the one or more animations. Further, the animation identifier is provided to a set of destination applications. In one embodiment, a single animation identifier can be issued collectively for the one or more animations individually commencing from an initial graphical representation specified in the start information and respectively terminating at end points in one or more applications in the set of destination applications. In another example, distinct animation identifiers can be generated and issued for each pairing of the first application to a destination application in the set.

At 820, respective end information is received from one or more destination applications in the set of destination applications. The end information can collectively include final graphical representations for each of the one or more destination applications as well as respective position and size information for each final graphical representation. At 830, one or more animations are drawn, initiating from the first application and terminating in the one more destination applications from the set of destination applications.

Figure 9:
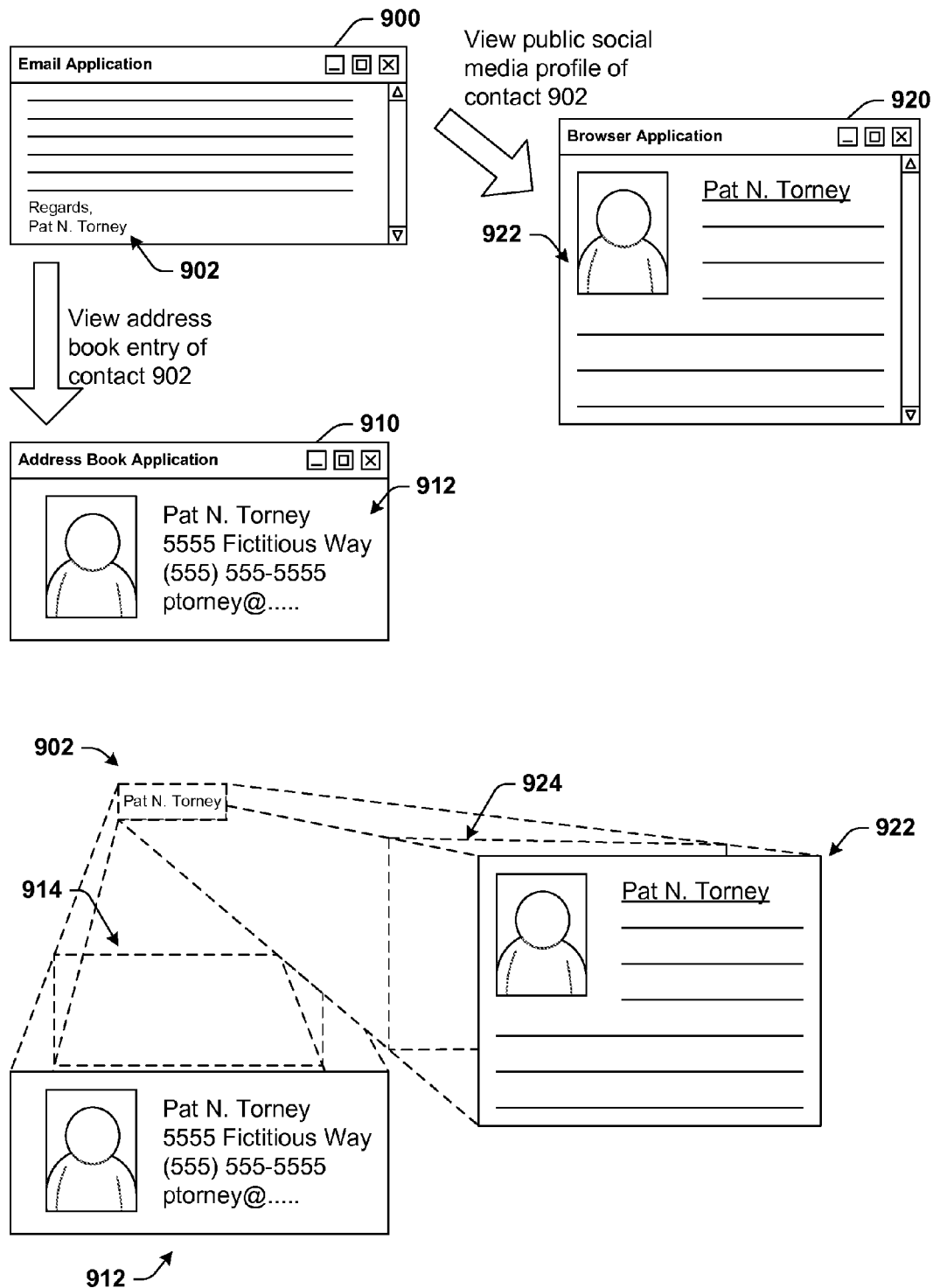
FIG. 9 is an exemplary, non-limiting illustration of multiple transition animations originating in one application and terminating in a plurality of applications.

FIG. 9 is an exemplary, non-limiting illustration of multiple transition animations originating in one application and terminating in a plurality of applications. As shown in FIG. 9, an animation can visually perform a context transition from a first application, e.g., email application 900, to a plurality of destination applications, e.g., address book application 910 and browser application 920. In particular, FIG. 9 illustrates a plurality of animations respectively depicting a context transition from email application 900 to address book application 910 and a context transition from email application 900 to browser application 920. The context switch between email application 900 and address book application 910 can involve viewing an entry in an address book associated with contact 902, e.g., name of contact, included in an email message displayed by email application 900. Additionally, the context switch between email application 900 and browser application 920 can involve a transition from selecting contact 902 in the email message to viewing/displaying a public social media profile in browser application 920.

The initial graphical representation for the example animations illustrated in FIG. 9 is contact 902, which is made up of a portion of text bounded by an invisible rectangle. The final graphical representations of the animations include an address book entry 912 in the address book application and a profile 922 in browser application 920. As depicted in FIG. 9, address book entry 912 can comprise a combination of images and text. Similarly, profile 922 can be a web page that likewise includes a variety of media such as text, images, videos, etc. To generate the animations, intermediate frames can be respectively generated for each constituent animation. For instance, intermediate frames 914 can be generated for the constituent animation between contact 902 and address book entry 912 and intermediate frames 924 are created for the constituent animation between contact 902 and profile 922.

In an embodiment, the constituent animations can be drawn jointly or separately. For instance, the animation between contact 902 and address book entry 912 can be drawn once address book application 910 is ready even if browser application 920 is not. In another example, neither animation commences until both address book application 910 and browser application 920 report readiness.

Figure 10:
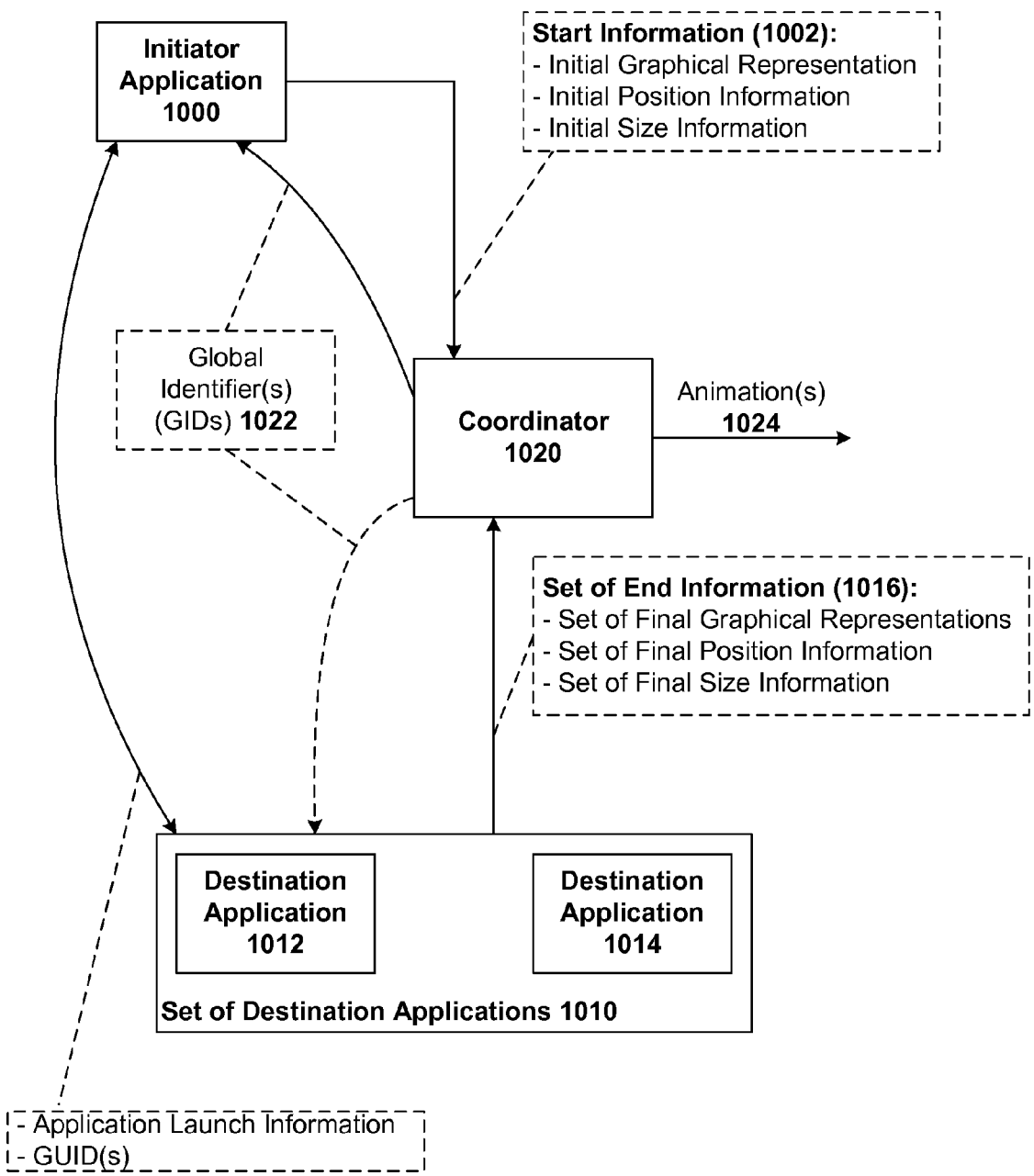
FIG. 10 is a block diagram of an exemplary, non-limiting animation coordination system in accordance with one or more embodiments.

FIG. 10 is a block diagram of an exemplary, non-limiting animation coordination system in accordance with one or more embodiments. The animation coordination system includes an initiator application 1000 and a set of destination applications 1010 between which animated context transitions occur. The system can also include a coordinator 1020 configured to generate animations 1024 depicting the context transitions between the initiator application 1000 and the set of destination applications 1010.

Initiator application 1000 can utilize animations 1024 to visualize context transitions with the set of destination applications 1010. To initiate an animation, initiator application 1000 sends start information 1002 to coordinator 1020. Start information 1002 can include an initial graphical representation, initial position information, and/or initial size information. Coordinator 1020, upon receipt of start information 1002, generates one or more global identifiers (GIDs) 1022. GIDs 1022 are associated with animations 1024 and are employed to index start information 1002 as related to animations 1024. Coordinator 1020 provides GIDs 1022 to initiator application 1000 in response to start information 1002. In addition, coordinator 1020 can also provide GIDs 1022 to applications in the set of destination applications 1010.

Upon obtaining GIDs 1022, the set of destination applications 1010 can transmit a set of end information 1016 to coordinator 1020. The set of end information 1016 includes end information respectively associated with each destination application in the set of destination applications 1010. The set of destination applications 1010 can include one or more applications, such as destination application 1012 and destination application 1014, which include graphical representations that are end points of transitional animations. While FIG. 10 depicts two destination applications in the set of destination applications 1010, it is to be appreciated that the set of destination applications 1010 can include N applications, where N is an integer greater than or equal to one. The set of end information 1016 can include a set of final graphical representation, a set of final position information, and/or a set of final position information. One group consisting of a final graphical representation in the set, along with associated final position information and final size information, can correspond to one destination application in the set of destination applications 1010.

Upon receiving the set of end information 1016, coordinator 1020 can generate animations 1024 based on start information 1002 and the set of end information 1016. Coordinator 1020 can separately draw sub-animations, e.g., an animation between initiator application 1000 and one of the destination applications, or can jointly draw all animations between initiator application 1000 and the set of destination applications 1010.

Figure 11:
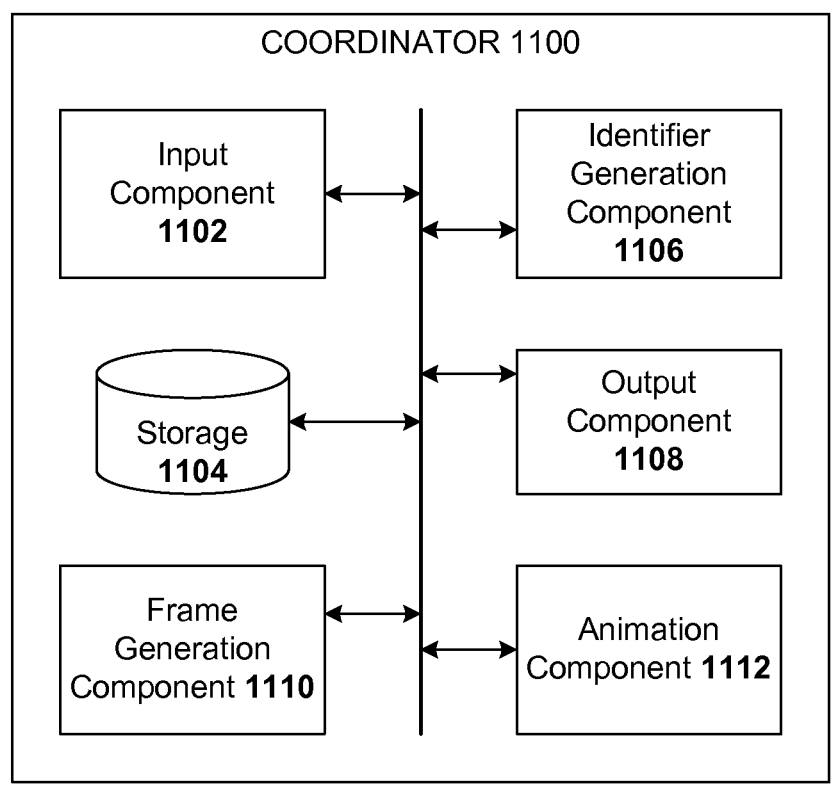
FIG. 11 is a block diagram of an exemplary, non-limiting animation coordinator in accordance with one or more embodiment.

With reference to FIG. 11, a block diagram is provided that illustrates an exemplary, non-limiting animation coordinator 1100 in accordance with one or more embodiments. As shown in FIG. 11, coordinator 1100 can include an input component 1102 configured to obtain start information, end information, readiness indicators, or the like, from one or more applications involved in an animated context transition. As described above, start information can include initial graphical representations, types of objects associated with the initial graphical representations, initial positions of the graphical representations, sizes of the graphical representations, identities, addresses, etc., of one or more destination applications at which animated transitions terminate, or any other suitable information to facilitate global rendering of an animation between applications. Similarly, end information specifies final graphical representations, types of objects associated with the final graphical representations, and positions and/or sizes of the graphical representations. In addition, end information can also include an animation identifier, associated with a particular animation, which correlates end information to corresponding start information. Input component 1102 can store start information and end information, in association with the animation identifier, in storage 1104.

An identifier generation component 1106 is provided, which is configured to generate the animation identifier for a new animation. For instance, upon receiving new start information from an application, coordinator 1100 commences a process to generate and draw a transitional animation. Coordinator 1100, in response to receiving start information, can employ identifier generation component 1106 to generate a corresponding animation identifier. In one embodiment, identifier generation component 1106 generates global identifiers (GIDs) to be employed as animation identifiers. However, it is to be appreciated that other types of identifiers can be utilized as animation identifiers in place of GIDs. Coordinator 1100, via an output component 1108, can provide the generated animation identifier to the application which sent the new start information. In addition, output component 1108 can send the animation identifier to any destination applications specified in the start information.

Once start information is received from an initiator application and end information is received from a destination application, coordinator 1100 can create a suitable animation based upon the received information. In one embodiment, coordinator 1100 can take the initial graphical representation and corresponding position/size information as a starting frame of the animation and the final graphical representation (and position/size details) as a final frame of the animation. Coordinator 1100 can employ a frame generation component 1110 to create intermediate frames of the animation between the starting frame and the final frame. The frame generation component 1110 can perform various transforms on the final graphical representation and/or the initial graphical representation to create intermediate graphical representations illustrating a transitional point between the initial graphical representation and the final graphical representation. In addition, the frame generation component 1110 can determine suitable positional information for the intermediate graphical representations based upon the initial position information and the final position information. Coordinator 1100 can store generated intermediate frames in storage 1104 in association with the animation identifier. Coordinator 1100 further includes an animation component 1112 configured to draw the starting frame, the intermediate frames, and the final frame on a display with an appropriate order and timing to create a seamless animation.

Figure 12:
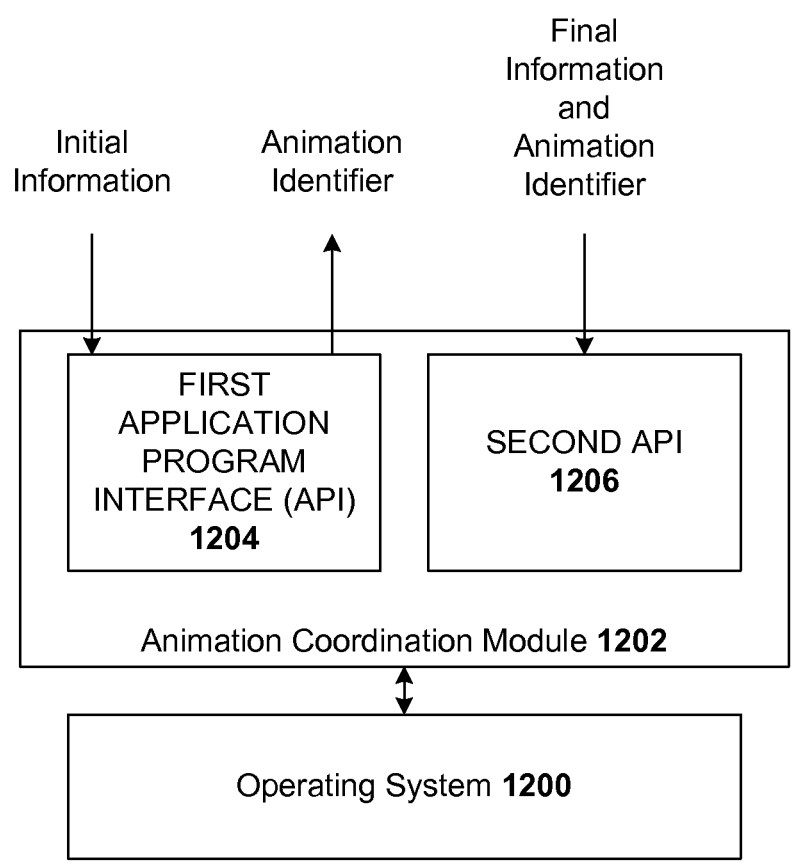
FIG. 12 is block diagram of illustrating an exemplary, non-limiting animation coordination system in accordance with one or more embodiments.

FIG. 12 is block diagram of illustrating an exemplary, non-limiting animation coordination system in accordance with one or more embodiments. As shown in FIG. 12, an animation coordination module 1202 can be integrated into an operating system 1200. Operating system 1200 can be provided within a computing system to manage hardware components (e.g., input devices, output devices, memory devices, storage devices, processing devices, etc.) of the computing system and provide common services (e.g., runtime libraries, etc.) to programs executed on the computing system, such as initiator and/or destination applications as described above. For instance, operating system 1200 can include a plurality of modules, such as animation coordination module 1202, extending common functionality via a plurality of application program interfaces (APIs). Operating system 1200 can receive a call to an API, execute a function or module associated therewith, and return a result to an entity initiating the call.

Animation coordination module 1202 can include a first API 1204 employable to trigger a transitional animation between arbitrary applications. First API 1204 is adapted to receive initial information, from an initiator application, and return an animation identifier. Animation coordination module 1202 further includes a second API 1206 configured to receive final information from a destination application. Animation coordination module 1202, upon receiving the final information via second API 1206, is configured to generate the transitional animation and output the animation to a display screen. For instance, animation coordination module 1202 can utilize a display driver (not shown) of operating system 1200 to access a video rendering device (e.g., graphics card in the computing system hosting operating system 1200) to visually display the animation on the display screen coupled to the video rendering device.

Exemplary Networked and Distributed Environments

One of ordinary skill in the art can appreciate that the various embodiments of transitional animation system and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 13:
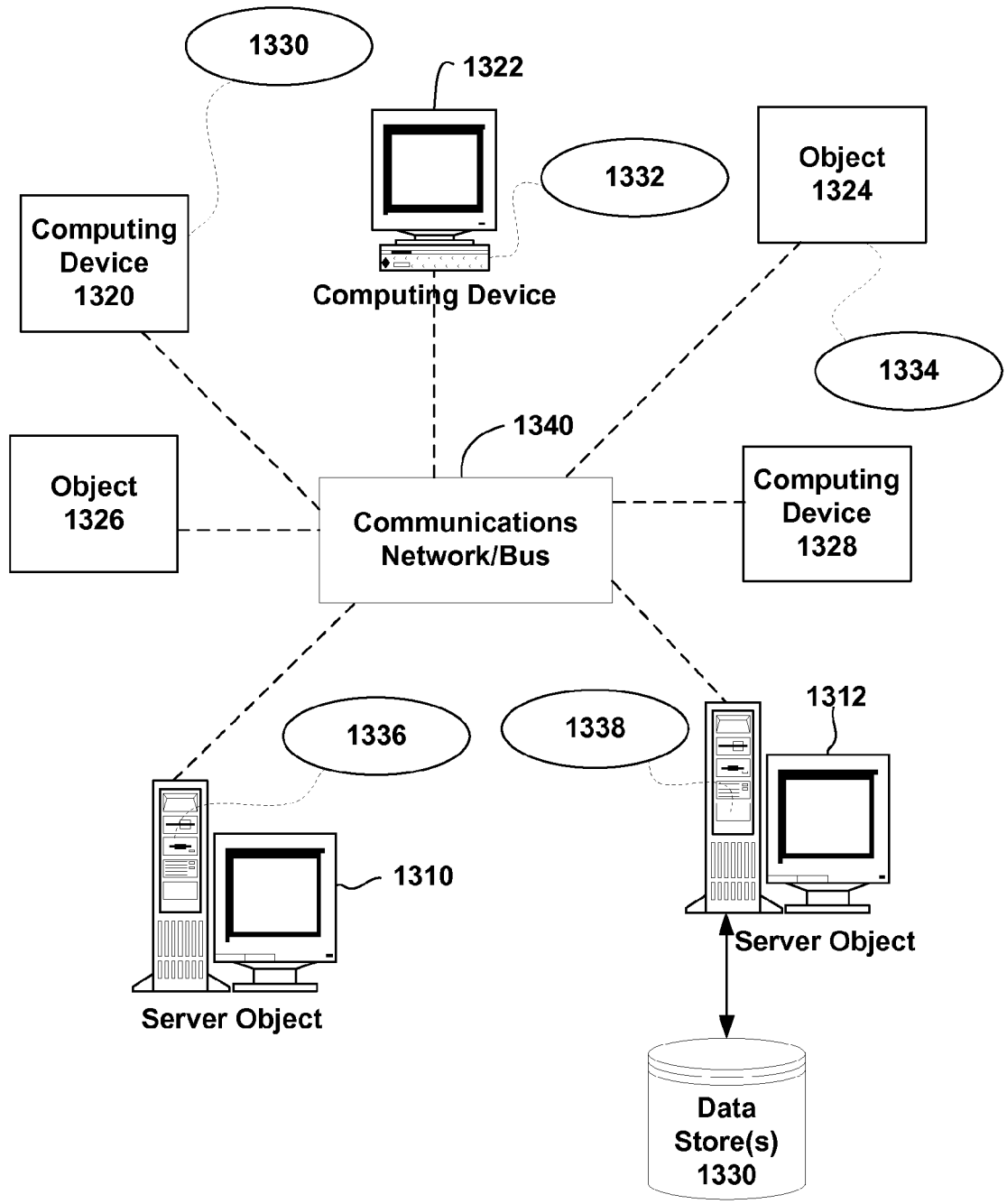
FIG. 13 is a block diagram representing exemplary non-limiting networked environments in which various embodiments described herein can be implemented.

FIG. 13 provides a schematic diagram of an exemplary networked or distributed computing environment. The distributed computing environment comprises computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338. It can be appreciated that computing objects 1310, 1312, etc. and computing objects or devices 1320, 1322, 1324, 1326, 1328, etc. may comprise different devices, such as personal digital assistants (PDAs), audio/video devices, mobile phones, MP3 players, personal computers, laptops, etc.

Each computing object 1310, 1312, etc. and computing objects or devices 1320, 1322, 1324, 1326, 1328, etc. can communicate with one or more other computing objects 1310, 1312, etc. and computing objects or devices 1320, 1322, 1324, 1326, 1328, etc. by way of the communications network 1340, either directly or indirectly. Even though illustrated as a single element in FIG. 13, communications network 1340 may comprise other computing objects and computing devices that provide services to the system of FIG. 13, and/or may represent multiple interconnected networks, which are not shown. Each computing object 1310, 1312, etc. or computing object or device 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of the application testing techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects 1310, 1312, etc. can be thought of as servers where computing objects 1310, 1312, etc., acting as servers provide data services, such as receiving data from client computing objects or devices 1320, 1322, 1324, 1326, 1328, etc., storing of data, processing of data, transmitting data to client computing objects or devices 1320, 1322, 1324, 1326, 1328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1340 or bus is the Internet, for example, the computing objects 1310, 1312, etc. can be Web servers with which other computing objects or devices 1320, 1322, 1324, 1326, 1328, etc. communicate via any of a number of known protocols, such as the hypertext transfer protocol (HTTP). Computing objects 1310, 1312, etc. acting as servers may also serve as clients, e.g., computing objects or devices 1320, 1322, 1324, 1326, 1328, etc., as may be characteristic of a distributed computing environment.

Exemplary Computing Device

As mentioned, advantageously, the techniques described herein can be applied to any device where it is desirable to create animations that visually depict context transitions between multiple arbitrary applications or processes in a computing system. It can be understood, therefore, that handheld, portable and other computing devices and computing objects of all kinds are contemplated for use in connection with the various embodiments, i.e., anywhere that where animations can facilitate seamless context transitions. Accordingly, the below general purpose remote computer described below in FIG. 14 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 14:
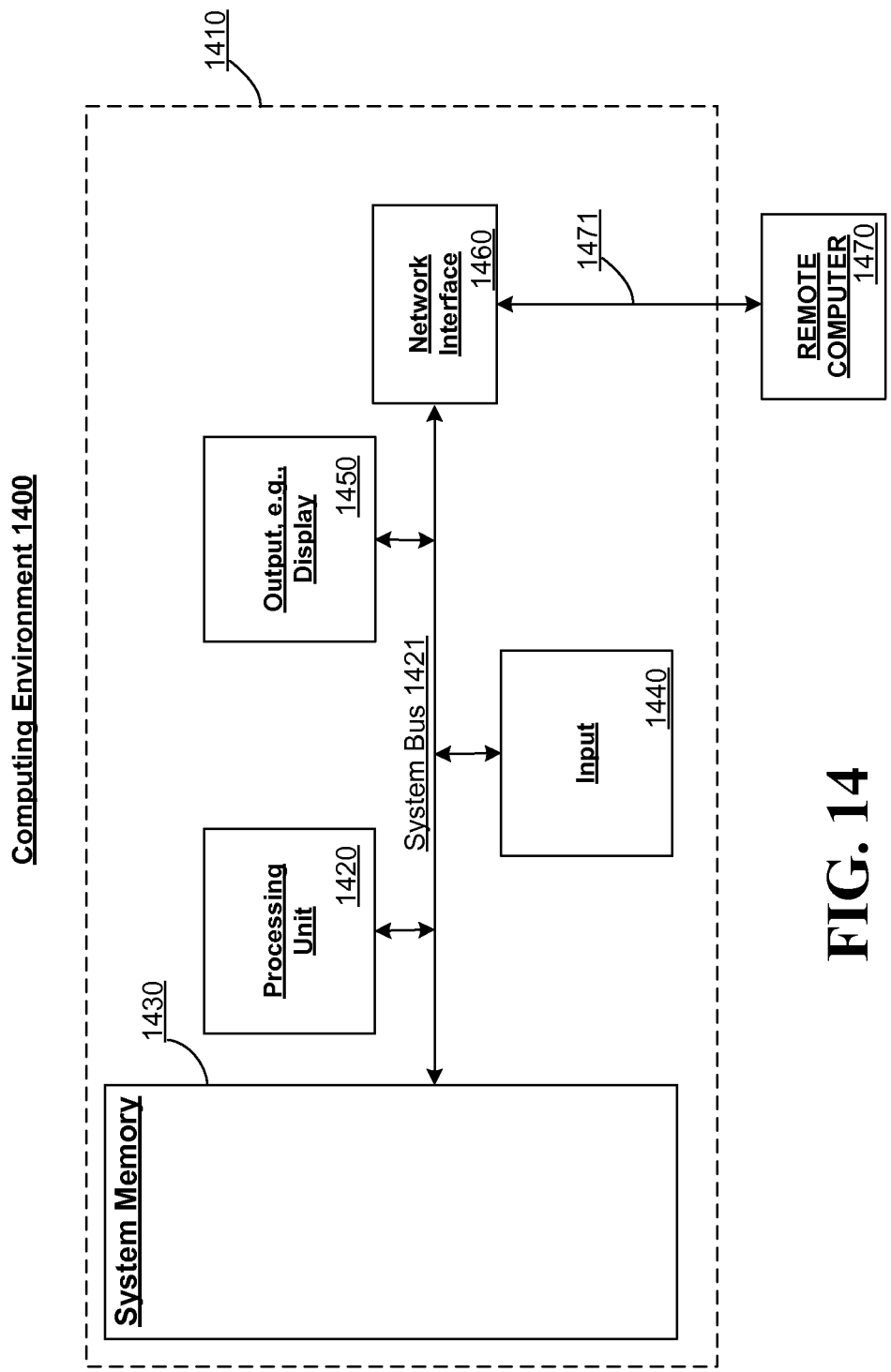
FIG. 14 is a block diagram representing an exemplary non-limiting computing system, device, or operating environment in which one or more aspects of various embodiments described herein can be implemented.

FIG. 14 thus illustrates an example of a suitable computing system environment 1400 in which one or aspects of the embodiments described herein can be implemented, although as made clear above, the computing system environment 1400 is only one example of a suitable computing environment and is not intended to suggest any limitation as to scope of use or functionality. In addition, the computing system environment 1400 is not intended to be interpreted as having any dependency relating to any one or combination of components illustrated in the exemplary computing system environment 1400.

With reference to FIG. 14, an exemplary remote device for implementing one or more embodiments includes a general purpose computing device in the form of a computer 1410. Components of computer 1410 may include, but are not limited to, a processing unit 1420, a system memory 1430, and a system bus 1422 that couples various system components including the system memory to the processing unit 1420.

Computer 1410 typically includes a variety of computer readable media and can be any available media that can be accessed by computer 1410. The system memory 1430 may include computer storage media in the form of volatile and/or nonvolatile memory such as read only memory (ROM) and/or random access memory (RAM). By way of example, and not limitation, system memory 1430 may also include an operating system, application programs, other program modules, and program data. According to a further example, computer 1410 can also include a variety of other media (not shown), which can include, without limitation, RAM, ROM, EEPROM, flash memory or other memory technology, CD- ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1410 through input devices 1440. A monitor or other type of display device is also connected to the system bus 1422 via an interface, such as output interface 1450. In addition to a monitor, computers can also include other peripheral output devices such as speakers and a printer, which may be connected through output interface 1450.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1472, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a coordination layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A computer storage medium, comprising a memory and/or a disk, having instructions stored therein for causing a computing device to perform operations, the operations comprising:

displaying a representation of an object in a graphical user interface display of an initiator application;

receiving, via the initiator application, an indication of an actuation of the representation of the object, the indication representing a request to open the object with a destination application that is different application than the initiator application;

coordinating an animated visual transition from the initiator application to the destination application based at least in part on information from the initiator application and on information from the destination application, wherein the coordinated animated visual transition has a visual appearance of morphing from the representation of the object in the graphical user interface display of the initiator application to a display of the destination application, and the coordinated animated visual transition depicting the opening of a window for the display of the destination application; and displaying the coordinated animated visual transition from the initiator application to the destination application on a display device of the computing device.

2. The computer storage medium of claim 1, wherein: coordinating the animated visual transition from the initiator application to the destination application includes:
receiving, by an animation coordination component, the information from the initiator application;
receiving, by the animation coordination component, the information from the destination application; and
rendering the coordinated animated visual transition from the initiator application to the destination application.

3. The computer storage medium of claim 1, wherein the coordinated animated visual transition visually depicts a shift in context of the computing device from the initiator application to the destination application.

4. The computer storage medium of claim 1, wherein the information from the initiator application includes a graphical representation of the object, a type of the object, and/or an initial position of the object.

5. A method of providing animated graphical transitions between applications executing on a computing device, the method comprising:
receiving, by the computing device, a request to transition a context of the computing device from a first context that is associated with an initiator application to a second context that is associated with a destination application other than the initiator application;
coordinating, by an animation coordination module executing on the computing device, an animated graphical transition from the initiator application to the destination application based at least in part on information from the initiator application and on information from the destination application, wherein the coordinated animated visual transition provides an appearance of originating from a representation of an object displayed by the initiator application and ending in another representation of the object displayed by the destination application, and the coordinated animated visual transition depicting the opening of the object with the destination application; and
displaying the coordinated animated graphical transition from the initiator application to the destination application on a display device associated with the computing device.

6. The method of claim 5, wherein:
coordinating the animated graphical transition includes:
receiving, by the animation coordination module, the information from the initiator application;
receiving, by the animation coordination module, the information from the destination application; and
rendering the coordinated animated graphical transition from the initiator application to the destination application based at least in part on information from the initiator application and on information from the destination application.

7. The method of claim 5, wherein the method further comprises:
switching the context of the computing device from the first context to the second context, wherein the coordinated animated graphical transition is displayed as part of the switch of the context.

8. The method of claim 5, wherein the method further comprises:
rendering the coordinated animated graphical transition, including:
creating a frame order for graphical representations of a set of graphical representations;
rendering multiple graphical representations of the set of graphical representations; and
determining, relative to each other, when the individual graphical representations of the multiple graphical representations are to be displayed.

9. The method of claim 5, wherein the request to transition the context of the computing device is also a request to open the object with the destination application.

10. The method of claim 5, further comprising:
generating an animation identifier that corresponds to the animated graphical transition;
issuing the animation identifier to the initiator application and to the destination application; and
storing the information from the initiator application and information from the destination application in conjunction with the animation identifier.

11. The method of claim 5, wherein displaying the coordinated animated graphical transition includes:
displaying the coordinated animated graphical transition at a top-most z-position on the display device.

12. The method of claim 5, displaying the coordinated animated graphical transition includes:
waiting for a readiness indicator from the destination application before commencing the displaying of the coordinated animated graphical transition.

13. The method of claim 12, wherein the readiness indicator is included in the information from the destination application.

14. A computing device for providing animated graphical transitions between applications executing thereon, the computing device comprising:
a memory and a processor, wherein the memory and the processor are respectively configured to store and execute computer executable instructions, including instructions for performing operations including:
receiving a request to transition a context of the computing device from a first context associated with an initiator application to a second context associated with a destination application different than the initiator application;
coordinating an animated graphical transition from the initiator application to the destination application based at least in part on information from the initiator application and on information from the destination application, wherein the coordinated animated visual transition provides an appearance of opening a window of the destination application for an object, and wherein the coordinated animated visual transition includes a plurality of intermediate graphical representations that bridge a difference between an initial graphical representation of the object in a window of the initiator application and a final graphical representation of the object in the window of the destination application; and
displaying the coordinated animated graphical transition from the initiator application to the destination application on a display device associated with the computing device.

15. The computing device of claim 14, wherein:
the request to transition the context of the computing device represents a request to open the object depicted in the initiator application with the destination application; and
coordinating the animated graphical transition includes:
  receiving, by an animation coordination module, the information from the initiator application;
  receiving, by the animation coordination module, the information from the destination application; and
  coordinating the coordinated animated graphical transition from the initiator application to the destination application based at least in part on the information from the initiator application and on the information from the destination application.

16. The computing device of claim 14, wherein coordinating the coordinated animated graphical transition includes:
creating a frame order for graphical representations of a set of graphical representations;
rendering multiple graphical representations of the set of graphical representations; and
determining, relative to each other, when the individual graphical representations of the multiple graphical representations are to be displayed.

17. The computing device of claim 14, wherein the operations further comprise:
generating an animation identifier that corresponds to the animated graphical transition;
issuing the animation identifier to the initiator application and to the destination application; and
storing the information from the initiator application and information from the destination application in conjunction with the animation identifier.

18. The computing device of claim 14, wherein displaying the coordinated animated graphical transition includes:
displaying the coordinated animated graphical transition at an enforced top-most z-position on the display device.

19. The computing device of claim 14, wherein coordinating the coordinated animated graphical transition includes:
creating the plurality of intermediate graphical representations that bridge the difference between the initial graphical representation of the object in the window of the initiator application and the final graphical representation of the object in the window of the destination application,
wherein a number of the plurality of intermediate graphical representations is in accordance with a predetermined frame rate for the animated graphical transition.

20. The computing device of claim 19, wherein the operations further comprise:
determining a set of position information associated with the plurality of intermediate graphical representations including:
  determining the position information based on at least one of initial position information from the initiator application or final position information from the destination application.

* * * * *